Oct. 15, 1946.   J. L. HUDSON   2,409,283
COUPLING FOR PLASTIC TUBES
Filed April 21, 1943
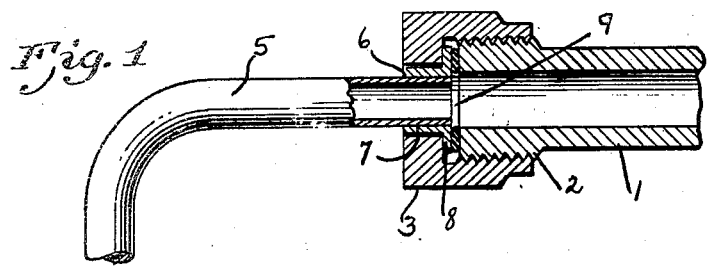
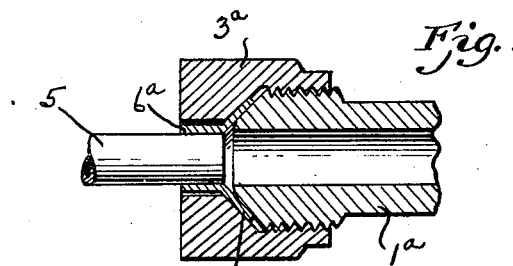
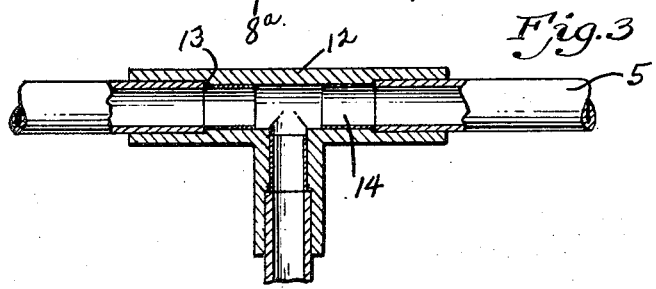
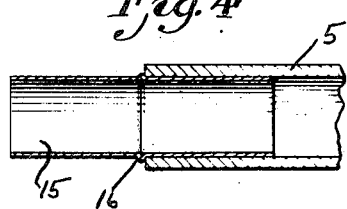
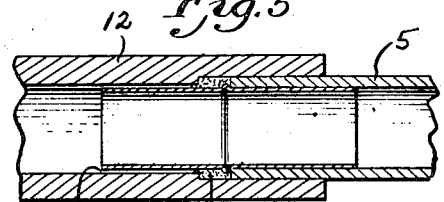
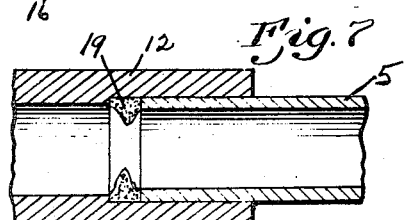
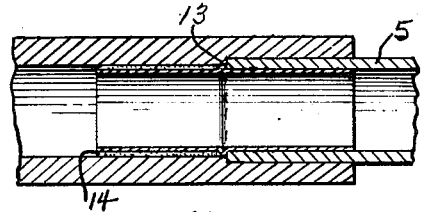
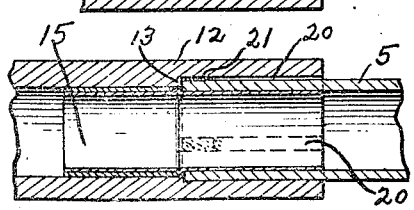
INVENTOR.
James L. Hudson.
BY Barnes, Kisselle, Laughlin & Raisch
Attorneys.

Patented Oct. 15, 1946

2,409,283

UNITED STATES PATENT OFFICE 2,409,283

COUPLING FOR PLASTIC TUBES

James L. Hudson, Detroit, Mich.

Application April 21, 1943, Serial No. 483,862

3 Claims. (Cl. 285—115)

This invention has to do with tubes or conduits composed of non-metallic material commonly referred to as plastic. The invention is concerned particularly with the provision of attaching or coupling means for the ends of such material.

Difficulty has been experienced in the coupling of the ends of plastic tubing to various terminal pieces or to fittings such as T's or L's or the like, from the standpoint of providing a connection which is initially satisfactory and from the standpoint of a coupling which will remain sound in use. There are a number of different types of plastics of which such tubing is or can be made including the plastics known as buterates and acetates, and other plastics which are known to the applicant only by their trade name of which the plastic known as "Saran" is an example. Such tubing has a number of advantages, including the fact that it has a considerable degree of flexibility. The material, however, has a cold flow factor and this characteristic is one of the things which has heretofore prevented the making of the satisfactory couplings between the ends of the tubing and other terminal pieces or fittings.

One form of coupling is that of providing a flange formation on the end of the tube substantially at right angles to the tube is referred to. Such a flange is difficult to form as it takes an exceedingly long time and usually requires some heating of the tube. Another form of coupling is the type where the tubing is provided with a flared end. Even though a flared coupling may initially be strong enough to hold under the conditions and internal pressure to which the tube is subjected, the cold flow factor may result in the fact that the flared end of the tube pulls out of the coupling member during use. In addition to the time consumed in forming the flange the material of the tube may be greatly weakened. When a coupling is made either of the flared type or of the flanged type, the coupling members which are screw threaded together may be drawn down too tightly and thus unduly compress and thin and weaken the flare or the flange. And no matter how tight the coupling may be made the cold flow factor may cause the connection to become loose and leaky.

The general object of the invention is to provide for a coupling or a connection for the ends of plastic tubing which will overcome the above problems and which can be easily and quickly made. To this end specially formed terminal pieces or fittings in the shape of T's or L's or the like are provided and the tube and the terminal pieces or fittings are united by the use of a plastic cement. The fittings or terminal pieces should preferably be of the same general composition of the tube, but of a more rigid, stronger or harder characteristic, while the cement employed should be of the same general composition as that of the tube and the fitting or terminal pieces, or should have a solvent action on both the tube and the terminal piece or fitting. Another object of the present invention is to provide for a connection wherein excess cement is prevented from clogging or choking the passageway. This is particularly useful where a blind connection is made; by a blind connection an arrangement is contemplated where there is no access to the interior of the tube or fitting after the connection has been made. To this end a sleeve or element is employed within the passageway for confining the excess cement to the vicinity of the inner walls of the passageway. Such a sleeve may be of a material which is soluble in the liquid to be used in the system so that it dissolves and passes off in use; or the sleeve or element may be of a material which disintegrates in the presence of the liquid to be conducted so that it passes off in use; however, the sleeve may remain permanently in position particularly if it has a thin wall so as not to unduly restrict the passage. Other objects will become appreciated as the following detailed description is considered in connection with the accompanying drawing.

Fig. 1 is a view largely in cross-section showing a flanged type of coupling.

Fig. 2 is a view largely in cross-section showing a flared type of coupling.

Fig. 3 is a view largely in cross-section showing the ends of three tubes connected to a T fitting.

Fig. 4 is a cross-sectional view showing the end of the tube and sleeve or element for confining the plastic cement.

Fig. 5 is a cross-sectional view showing the position of the tube and a fitting as the coupling is being made.

Fig. 6 is a view of the parts shown in Fig. 5 illustrating the position of the parts with the coupling completed but prior to the dissolving of the soluble sleeve.

Fig. 7 is a view illustrating the difficulty encountered in the absence of the employment of a confining sleeve.

Fig. 8 is a sectional view illustrating a modified form of the invention.

By making reference first to Fig. 1 a terminal of an element in a system such, for example, as the inlet end of a tap for beer, is illustrated at 1 provided with screw threads 2. A suitable cap 3 is internally threaded for attachment to the piece 1. The plastic tube is shown at 5 and it is to be connected to the piece 1. Instead of providing a flange by turning outwardly the end of the material forming the tube, a separate terminal piece 6 is provided having a tubular portion 7 and a flange 8 adapted to be engaged between the end of the part 1 and the nut 3. A washer 9 may be employed.

The terminal piece 6 is of plastic material and it is formed initially in the shape in which it is used. Advantageously the terminal piece 6 is comprised of a plastic similar to that of the tube, but it is a harder and stronger grade, so that it has shape retaining properties and substantially no cold flow factor and having such strength that it will not be weakened or distorted by an undue tightening of the nut 3 onto the part 1. The part 1 and the nut 3 may be of metal as these parts may have previously been incorporated in a fluid handling apparatus.

It is contemplated that the connection may be made on the job, so to speak. That is to say, assuming the part 1 to be already incorporated in a fluid dispensing apparatus, the operator may attach the tube thereto at the installation. In making the coupling the exterior surface of the end of the tube is coated with the plastic cement; the interior surface of the cylindrical part 7 is also coated with the plastic cement. The plastic cement may be applied with a brush or other suitable swab or device. Then the tube, which has a snug fit with the sleeve 7, is pushed into the sleeve and upon setting of the cement the terminal piece 6 and the tube are permanently united and in effect become one.

Where the tube and terminal piece are of the same basic type of plastic, a cement of the same basic type can be employed to the end that the tube, which is flexible, and the terminal piece, which is not flexible, are integrally united. Any excess cement can be removed. The nut 3 can be passed over the tube before the terminal piece is applied and then the parts are assembled substantially as shown in Fig. 1, and the nut tightened to complete the coupling between the tube and the part 1.

In some instances it may be desirable or advantageous to first attach the terminal piece 6 to the part 1 by tightening the nut 3 and then attach the tube to the terminal piece. In this event, after the interior surface of the terminal piece is coated with the plastic and the exterior of the end of the tube is coated with plastic, the end of the tube is pushed into the terminal piece. This manner of making the coupling would eliminate any twisting action on the tube since the nut is tightened before the tube is attached. However, the making of the connection in this manner involves the problem of handling the excess cement so that the sleeve or filler, as shown in Fig. 4, may need be employed. This will be described later.

The invention can be carried out by employing a plastic tube and a terminal piece or fitting which are not of the same basic type of plastic. In this event, however, it is preferable that the cement contain a constituent with a solvent action on both types of plastic to provide the integral type of connection.

The type of coupling has a flange of flared form and shown in Fig. 2 may be employed where it is desirable or necessary to uncouple the connection occasionally, although the flared type of coupling can be used where the connection is of the permanent type. In Fig. 2 the element 1a and the cut 3a have surfaces which are inclined to a radial plane and the terminal piece 6a has a flared end 8a to be clamped therebetween. The connection can be made in the manner as described above in regards to Fig. 1. At this point, it can readily be appreciated that if the end of the flexible tube 5 be flared and clamped between the tapered surface that the cold flow factor may result in a loosening of the connection after it is made and probably the complete pulling out of the tube from between the part 1a and the nut 3a.

Where a connection is to be made, following which there is no access to the interior of the tube, a sleeve or guard is preferably used to prevent choking, clogging or partial clogging of the passage. Fig. 3 exemplifies such blind connections where three tubes 5 are connected to a T shaped fitting 12. Each opening of the T, which is of plastic material, is shaped to have a snug fit with the tube terminating in a shoulder 13 against which the end of the tube is adapted to abut. The excess hardened cement is shown at 14. This, of course, illustrates the completed connections which were made by swabbing or coating the interior of the openings of the T and the exterior of the ends of the tube with the cement and then pushing the ends of the tube into position.

To make the blind connections, as shown in Fig. 3, a sleeve or guard 15 is preferably employed. This guard or sleeve for example may be made of a suitable gelatin which is soluble in water. The wall thereof may be fairly thin, as illustrated, and it is pushed into the tube as shown in Fig. 4. The sleeve may have a shoulder 16 which abuts the end of the tube for the purpose of properly locating the sleeve. The manner in which the sleeve functions is shown in Fig. 5 where the tube is shown in a position as it is being pushed into the end of the fitting such as the T fitting 12. The tube, of course, has a close fit within the fitting and the cement may be applied to the parts without particular care, with the result that there is an excess. As the tube is pushed into position the excess accumulates, as illustrated at 17, but the sleeve confines the excess to a cylinder-like form. In other words, the excess is caused to flow into the annular space 18 between the internal wall of the fitting and the sleeve. This is illustrated in Fig. 6. The flange or enlargement 16 is preferably of small dimensions so as to not prevent the end of the tube from contacting the shoulder 13. Were it not for the sleeve the excess cement might be pushed inwardly of the passage as shown at 19, in Fig. 7, and obviously since the cement sets up the passage is choked or might be completely clogged and there is no way to gain access thereto. Now, if the coupling, as shown in Fig. 1 or shown in Fig. 2, is to be made after the nut 3 or 3a clamps the fitting 6 or 6a in position, the sleeve 15 should be employed because in this case the coupling is blind. However, if the terminal piece 6 or 6a is attached to the tube before the coupling is completed, the excess cement can be removed.

After the coupling with the sleeve is made the sleeve may be dissolved by passing water through the system. On the other hand, if the coupling is made in a system for disposing or otherwise handling liquids, the sleeve quickly dissolves in such liquid and passes off with the first view of dispensations. The sleeve can be made of other substances which will dissolve or disintegrate in the presence of the liquid to be conducted. Sugar, paper or pulp with a soluble binder, or a powder bound into sleeve form by a soluble binder are examples. Where the system is to be employed with liquids other than water, including acids or alcohol, the sleeve may be formed of a material soluble in such liquids or of a material which disintegrates in such liquids. Where, for example, a sleeve of sugar is provided, it may be made with a thick wall with a small opening therein to give it the necessary body strength. Still further it is within the invention to employ a sleeve which will remain permanently in position as shown in Fig. 6. Such a sleeve may then be made of a plastic or other material which is not soluble in the liquid which is to be conducted. In this case, however, the substance should have sufficient strength so that the sleeve may be formed with an adequately thin wall.

The modified form shown in Fig. 8 is similar to the connection shown in Fig. 3 and in Fig. 6 and the reference characters are the same in so far as they are applied to like parts. In this form, however, there is an additional space provided for receiving the excess cement. This space being provided by grooves 20 formed in the interior walls of the fitting and some of the excess cement may flow into the space as shown at 21.

I claim:

1. A coupling comprising a tube element of plastic material, an element such as a terminal piece or fitting of plastic material, one of the elements being constructed to telescopingly receive the other, a connection between the interfacing telescoping surfaces comprising a cement of plastic material unitable with the plastic material of both elements, a sleeve positioned within one of the elements and having a part with its external wall spaced from the inner wall of the other element to provide a space for confining excess cement.

2. A coupling comprising a tube element of plastic material, an element such as a terminal piece or fitting of plastic material, one of the elements being constructed to telescopingly receive the other, a connection between the interfacing telescoping surfaces comprising a cement of plastic material unitable with the plastic material of both elements, a sleeve positioned within one of the elements and having a part with its external wall spaced from the inner wall of the other element to provide a space for confining excess cement, and clearance ways in the telescoping interfacial surface of at least one element for receiving excess cement.

3. In a coupling structure for plastic tube, a tube comprised of a plastic material having flexible and cold flow characteristics, an element such as a terminal piece or fitting comprised of a plastic material of the same general type as that of the tube, the plastic of the terminal piece or fitting having inflexible and shape-retaining characteristics, said element having an open end which is relatively enlarged internally and having an internal shoulder defining the inner end or enlargement, the tube being telescopingly received in said enlargement with its end substantially abutting the internal shoulder, means comprising a film of plastic cement between the telescoping portions of the tube and element which has a solvent action on the plastic material of both the tube and element for permanently uniting the tube and element, and a fillet of said cement bonded to the internal wall of said element and positioned next adjacent to and projecting from the end of the tube, said fillet being of thin-walled tubular shape and formed by excess cement initially held in tubular shape and against the internal wall of said element by an internal sleeve projecting from the tube.

JAMES L. HUDSON.